(12) United States Patent
Hauser et al.

(10) Patent No.: US 11,355,789 B2
(45) Date of Patent: Jun. 7, 2022

(54) BYPASS CIRCUIT AT A RECHARGEABLE BATTERY

(71) Applicant: Hilti Aktiengesellschaft, Schaan (LI)

(72) Inventors: Klaus Hauser, Schwabmuenchen (DE); Michael Candussio, Olching (DE); Stefan Mayer, Dachau (DE); David Koscheck, Augsburg (DE); Markus Forstner, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 219 days.

(21) Appl. No.: 16/630,267

(22) PCT Filed: Jul. 23, 2018

(86) PCT No.: PCT/EP2018/069857
§ 371 (c)(1),
(2) Date: Jan. 10, 2020

(87) PCT Pub. No.: WO2019/020539
PCT Pub. Date: Jan. 31, 2019

(65) Prior Publication Data
US 2020/0212506 A1    Jul. 2, 2020

(30) Foreign Application Priority Data
Jul. 27, 2017 (EP) ..................................... 17183450

(51) Int. Cl.
*H01M 10/42* (2006.01)
*B25F 5/02* (2006.01)
(Continued)

(52) U.S. Cl.
CPC ............. *H01M 10/425* (2013.01); *B25F 5/02* (2013.01); *H01M 10/0525* (2013.01);
(Continued)

(58) Field of Classification Search
CPC ........... H01M 10/425; H01M 10/0525; H01M 2010/4271; H01M 2220/30; H01M 50/20;
(Continued)

(56) References Cited

U.S. PATENT DOCUMENTS

2005/0073282 A1    4/2005    Carrier
2010/0027249 A1*   2/2010    Connor ................... F21L 13/06
                                                          362/183

FOREIGN PATENT DOCUMENTS

DE          102014203476 A1        8/2015

OTHER PUBLICATIONS

International Search Report of PCT/EP2018/069857, dated Nov. 8, 2018.

* cited by examiner

*Primary Examiner* — Gary D Harris
(74) *Attorney, Agent, or Firm* — Davidson, Davidson & Kappel, LLC

(57) ABSTRACT

Rechargeable battery for a machine tool containing at least one energy storage cell and also one switching apparatus. The rechargeable battery contains a bypass circuit which can be operated in a first and second mode, wherein the bypass circuit is in an inoperative state in the first mode, so that an electric current with a first current value passes from the at least one energy storage cell to the machine tool via the switching apparatus, and wherein the bypass circuit is in an operating state in the second mode, so that an electric current with a second current value passes from the at least one energy storage cell to the machine tool via the bypass apparatus, and wherein the first current value is greater than the second current value. The bypass circuit contains a comparator for comparing a current value which is required by the machine tool with a stored current threshold value, so that, via switching element, the bypass circuit is switched to
(Continued)

the first mode when the current value which is required by the machine tool exceeds the threshold value and the bypass circuit is switched to the second mode when the current value which is required by the machine tool falls below the threshold value.

10 Claims, 2 Drawing Sheets

(51) Int. Cl.
*H01M 10/0525* (2010.01)
*H02J 7/00* (2006.01)
*H02J 9/00* (2006.01)
*B25B 21/00* (2006.01)

(52) U.S. Cl.
CPC ............ *H02J 7/0063* (2013.01); *H02J 9/005* (2013.01); *B25B 21/00* (2013.01); *H01M 2010/4271* (2013.01); *H01M 2220/30* (2013.01)

(58) Field of Classification Search
CPC ... H01M 10/44; B25F 5/02; B25F 5/00; H02J 7/0063; H02J 9/005; H02J 7/007; B25B 21/00; Y02E 60/10
USPC .......................................................... 429/7
See application file for complete search history.

BYPASS CIRCUIT AT A RECHARGEABLE BATTERY

The present invention relates to a rechargeable battery for a machine tool containing at least one energy storage cell and also one switching apparatus.

BACKGROUND

Cordless machine tools can be operated with a rechargeable battery for power supply. The cordless machine tool may be, for example, a rechargeable battery-operated screwdriver.

Rechargeable batteries usually contain a number of storage cells for electrical energy. Modern rechargeable batteries have a control electronics system for the purpose of controlling a charging or discharging process of the storage cells, in which charging or discharging process the storage cells are either charged with electrical energy or electrical energy is drawn from the storage cells. The storage cells are also referred to as rechargeable battery cells.

When a rechargeable battery-operated machine tool of this kind is not used for a relatively long period of time, the rechargeable battery and also the electrical loads of the machine tool, such as the electric motor or the control electronics system for example, are usually completely switched off in order to save electric current of the rechargeable battery. The electrical and also electronic loads of the machine tool are then in an inoperative state. Accordingly, no electric current flows from the rechargeable battery to the electrical loads of the machine tool in this inoperative state. The electrical voltage is maintained in the individual storage cells of the rechargeable battery.

However, in order to put the machine tool into operation again or at least to put said machine tool into a ready-to-operate state (also called standby mode), the control electronics system of the machine tool requires a so-called wake-up call. The wake-up call can also be referred to as a wake-up alarm. After the control electronics system of the machine tool has been put back into a ready-to-operate mode by the wake-up call, the remaining components of the machine tool, in particular the electric motor of the machine tool, can also be moved back to the ready-to-operate mode, so that the entire machine tool can be put into operation again.

However, for the purpose of generating a wake-up call in the control electronics system, it is necessary for a certain current intensity to flow from the storage cells of the rechargeable battery to the control electronics system of the machine tool. This current intensity which is required for generating a wake-up call is usually relatively low and a great deal lower than the maximum current intensity which can be provided by all of the storage cells.

However, one problem is that, in the case of the rechargeable batteries according to the prior art, provision is not made for a correspondingly low current intensity for a wake-up call to be provided in the control electronics system of the machine tool when the rechargeable battery, for energy-saving purposes, is in the inoperative state and is completely switched off in the process.

SUMMARY OF THE INVENTION

It is an object of the present invention to provide a rechargeable battery for a machine tool containing at least one energy storage cell and also one switching apparatus, with which the abovementioned problems can be solved.

The present invention provides a rechargeable battery for a machine tool containing at least one energy storage cell and also one switching apparatus.

According to the invention, provision is made for said rechargeable battery to contain a bypass circuit which can be operated in a first and second mode, wherein the bypass circuit is in an inoperative state in the first mode, so that an electric current with a first current value passes from the at least one energy storage cell to the machine tool via the switching apparatus, and wherein the bypass circuit is in an operating state in the second mode, so that an electric current with a second current value passes from the at least one energy storage cell to the machine tool via the bypass apparatus, wherein the first current value is greater than the second current value, and wherein the bypass circuit contains a comparator for comparing a current value which is required by the machine tool with a stored current threshold value, so that, by means of a switching element, the bypass circuit is switched to the first mode when the current value which is required by the machine tool exceeds the threshold value and the bypass circuit is switched to the second mode when the current value which is required by the machine tool falls below the threshold value.

In this way, the rechargeable battery can be put into an energy-saving inoperative state in which a sufficient amount of current for a potential wake-up call can be provided at the same time.

According to an advantageous refinement of the present invention, it may be possible for the at least one energy storage cell to be designed in the form of a lithium-ion cell.

Owing to the design of the at least one energy storage cell in the form of a lithium-ion cell, an energy source with a particularly high volume-related energy density and also a particularly long service life is provided.

Further advantages can be found in the description of the figures that follows. The figures depict various exemplary embodiments of the present invention. The figures, the description and the claims contain numerous features in combination. A person skilled in the art will expediently also consider the features individually and combine them to produce useful further combinations.

DETAILED DESCRIPTION

Figure 1:
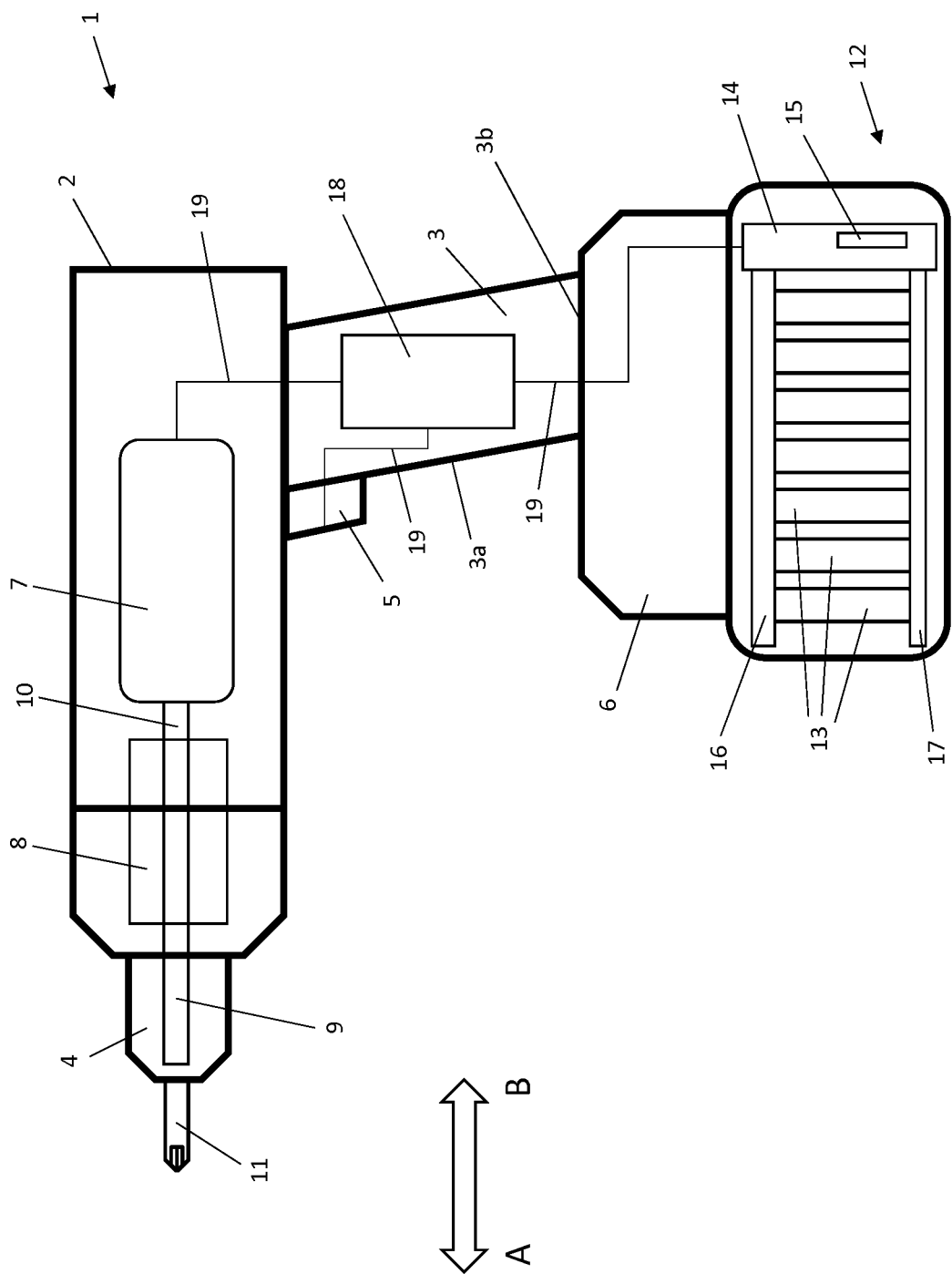
FIG. 1 shows a side view of a machine tool comprising a rechargeable battery according to the invention which is connected to the machine tool.

FIG. 1 depicts a machine tool 1. The machine tool 1 is designed, for example, in the form of a rechargeable battery-operated screwdriver and substantially contains a housing 2, a handle 3, a tool holder 4, an activation switch 5 and also a base part 6.

An electric motor 7, a gear mechanism 8, a drive shaft 9 and an output shaft 10 are positioned in the interior of the housing 2. The electric motor 7 is connected to the gear mechanism 8 by means of the output shaft 10. The gear mechanism 8 is further connected to the tool holder 4 by means of the drive shaft 9. The electric motor 7 serves to generate a torque which can be transmitted to the tool holder 4 by means of the output shaft 10, the gear mechanism 8 and the drive shaft 9. The tool holder 4 is positioned at a front end 2a of the housing 2 of the machine tool 1. A tool 11, for example in the form of a screwdriver blade (also called bit) can be received and held by the tool holder 4. The tool holder 4 transmits the torque from the drive shaft 9 to the tool 11, which is designed as a bit, in order to screw a screw into a material. The material and the screw are not illustrated in the figures.

The handle 3 is fastened to a lower end of the housing 2. The handle 3 has, in particular, a front side 3a and a lower end 3b. The activation switch 5 is positioned on the front side 3a.

Furthermore, the base part 6 is fastened to the lower end 3b of the handle 3. A rechargeable battery 12, for its part, is detachably positioned at a lower end 6a of the base part 6.

The rechargeable battery 12 serves to supply electrical energy to the machine tool 1. To this end, the rechargeable battery 12 substantially contains a number of energy storage cells 13 (also called rechargeable battery cells) and also a controller 14. The controller 14, for its part, contains a switching apparatus 15. The switching apparatus 15 serves to interrupt the power supply from the rechargeable battery to the machine tool 1.

The individual rechargeable battery cells 13 are mechanically and electrically connected to the controller 14 by means of an upper and a lower cell holder 16, 17, so that electrical energy can flow from the individual energy storage cells 13 to the controller 14.

A control apparatus, i.e. a controller, 18 for the machine tool 1 is provided in the interior of the handle 3. The control apparatus 18 is connected to the electric motor 7, to the activation switch 5 and also to the controller 14 of the rechargeable battery 12 via lines 19. In this case, the lines 19 serve to transmit signals and electric current.

Therefore, a signal can be sent to the control apparatus 18 by the activation switch 5 by way of moving the activation switch 5 in direction B, as a result of which the control apparatus 18, for its part, sends a signal to the controller 14 of the rechargeable battery 12. Electrical energy with a specific current value is sent from the rechargeable battery cells 13 to the electrical loads of the machine tool 1 and, in particular, to the electric motor 7 by the signal which is sent to the controller 14. In order to send a signal to the control apparatus 18 in accordance with the distance traveled by the activation switch 5 in direction B, the activation switch 5 contains a potentiometer, not shown.

If the activation switch 5 moves in direction A again, a corresponding signal is sent to the control apparatus 18 with the aid of the potentiometer, so that no more current flows from the rechargeable battery cells 13 to the machine tool 1.

In the event of the machine tool 1 not being in use for a certain time, the machine tool 1 and the rechargeable battery 12 are completely switched off. To this end, the switching apparatus 15 is switched such that the current flow from the rechargeable battery cells 13 to the machine tool is interrupted. Both the machine tool 1 and also the rechargeable battery 12 are then in an inoperative state.

In order to move the machine tool 1 and, in particular, the control apparatus 18 from the inoperative state back into a standby state (ready-to-operate mode) or an activation state, the control apparatus 18 requires a so-called wake-up call. The wake-up call can also be referred to as a wake-up alarm. Owing to the wake-up call, the control apparatus 18 or the individual components of the control apparatus 18 are moved back into a state in which the control apparatus 18 can again supply the machine tool 1 and, in particular, the electric motor 7 with electric current from the rechargeable battery cells 13.

Electrical energy with a certain current value is required from the rechargeable battery cells 13 for the wake-up call. The current value for a wake-up call is usually relatively low.

In order that the control apparatus 18 of the machine tool 1 can also be supplied with an appropriate current value for a wake-up call in a switched-off state or in the inoperative state, the switching apparatus 15 of the rechargeable battery controller 14 contains a bypass circuit 20.

Figure 2:
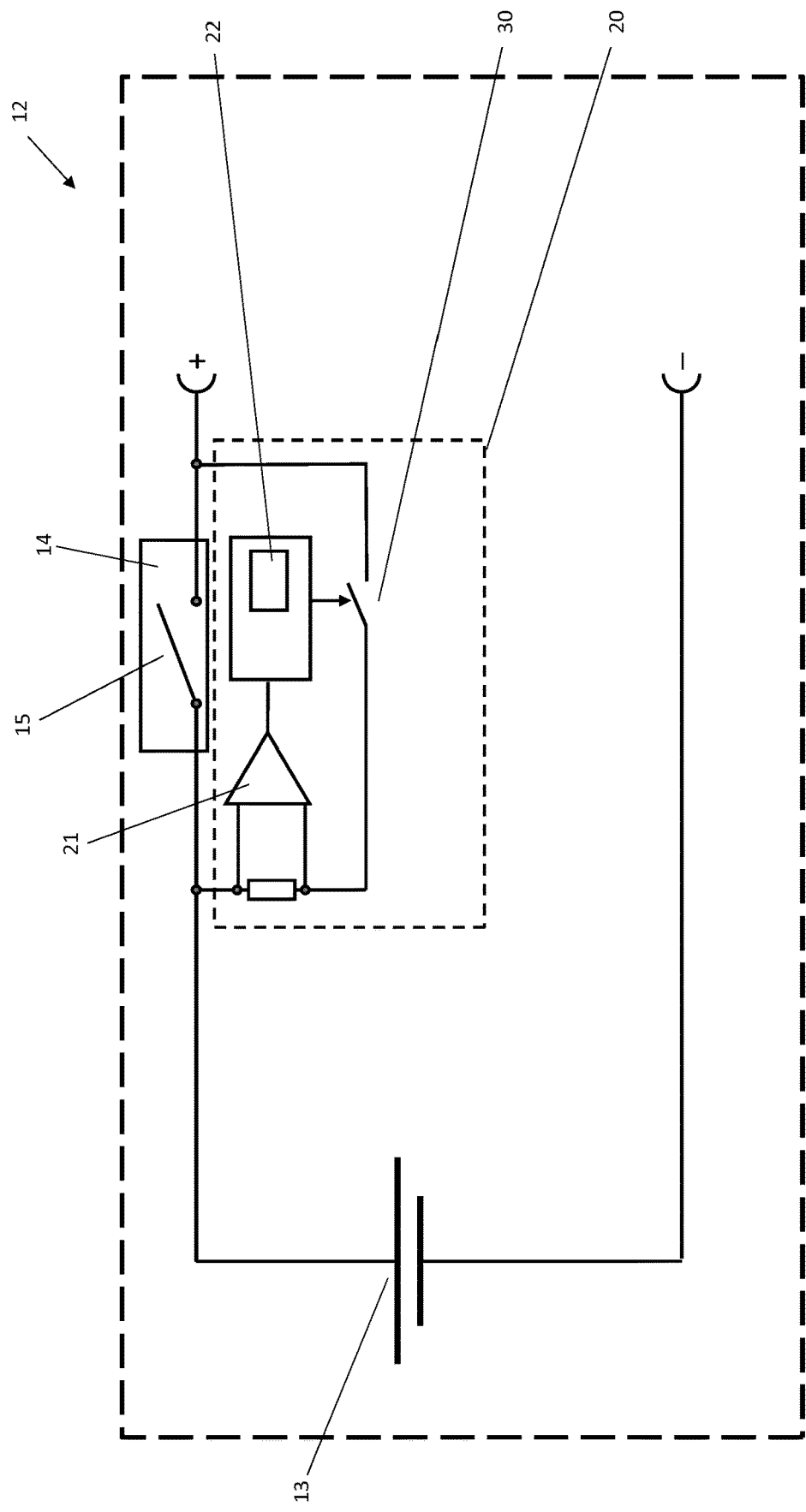
FIG. 2 shows a circuit diagram of a switching apparatus of the rechargeable battery comprising the bypass circuit.

As shown in FIG. 2, the bypass circuit 20 is positioned on the switching apparatus 15 such that there is a circumvention (i.e. bypass) for the electric current from the rechargeable battery cells 13 around the switching apparatus 15 to the machine tool 1. Furthermore, the bypass circuit 20 contains a switching element 30, a comparator 21 and a memory element 22.

The comparator 21 serves to compare a current value which is required by the machine tool 1 with a current threshold value which is stored in the memory element 22.

The bypass circuit 20 is designed such that it can assume a first operating mode and second operating mode. The switching element 30 serves to move the bypass circuit 20 into the first or second operating mode.

In the first operating mode, the bypass circuit 20 is in an inoperative state, so that a high current value can flow from the rechargeable battery cells 13 to the machine tool 1. In this case, the switching apparatus 15 is closed. In the process, the current from the rechargeable battery cells 13 does not flow through the bypass circuit 20 and it is possible for a maximum current value to be able to be called up from the rechargeable battery cells 13. In this case, said high current value is higher than the current value which is required for a wake-up call.

In the second mode, the bypass circuit 20 is in an operating state in which electrical energy with a second current value can flow from the rechargeable battery cells 13, through the bypass circuit 20, to the machine tool 1. In this case, the second current value is lower than the first current value and sufficient for a wake-up call in the control apparatus 18 of the machine tool 1.

As already described above, the comparator 21 is designed in order to compare the current value which is required by the machine tool 1 with a current threshold value. In this case, the machine tool 1 requires either a low or a high current value.

The low current value is required for a wake-up call if the machine tool 1 is in an inoperative state. In this case, the low current value is so low that the rechargeable battery cells 13 are not noticeably discharged.

In contrast, the high current value is required in order to put the machine tool 1 into the normal operating state, so that the electric motor 7 can generate a torque.

The invention claimed is:
1. A rechargeable battery for a machine tool comprising:
at least one energy storage cell;
a switch apparatus; and
a bypass circuit operable in a first and second mode, the bypass circuit being in an inoperative state in the first mode, so that an electric current with a first current value passes from the at least one energy storage cell to the machine tool via the switch apparatus and the bypass circuit being in an operating state in the second mode, so that an electric current with a second current value passes from the at least one energy storage cell to the machine tool via the bypass circuit, the first current value being greater than the second current value, the bypass circuit including a comparator for comparing a current value required by the machine tool with a stored current threshold value, so that, via a switch element, the bypass circuit is switched to the first mode when the current value required by the machine tool exceeds the threshold value and the bypass circuit is switched to the second mode when the current value required by the machine tool falls below the threshold value.

2. The rechargeable battery as recited in claim 1 wherein the at least one energy storage cell is a lithium-ion cell.

3. The rechargeable battery as recited in claim 1 wherein the bypass circuit contains the switch element.

4. The rechargeable battery as recited in claim 3 wherein the bypass circuit contains a memory element.

5. The rechargeable battery as recited in claim 3 wherein the memory element stores the stored current threshold value.

6. The rechargeable battery as recited in claim 3 wherein the memory element stored the stored current threshold value.

7. The rechargeable battery as recited in claim 1 wherein the stored current threshold value is greater than zero.

8. A rechargeable battery for a machine tool comprising:
at least one energy storage cell;
a switch apparatus; and
a bypass circuit with a switch element in parallel to the switch apparatus, the bypass circuit operable in a first and second mode, the bypass circuit being in an inoperative state in the first mode, so that an electric current with a first current value passes from the at least one energy storage cell to the machine tool via the switch apparatus and the bypass circuit being in an operating state in the second mode, so that an electric current with a second current value passes from the at least one energy storage cell to the machine tool via the bypass circuit, the first current value being greater than the second current value,
the bypass circuit including a comparator for comparing a current value required by the machine tool with a stored current threshold value stored in a memory element, so that, via a switch element, the bypass circuit is switched to the first mode when the current value required by the machine tool exceeds the threshold value and the bypass circuit is switched to the second mode when the current value required by the machine tool falls below the threshold value.

9. The rechargeable battery as recited in claim 8 wherein the at least one energy storage cell is a lithium-ion cell.

10. The rechargeable battery as recited in claim 1 wherein the stored current threshold value is greater than zero.

* * * * *